US009482283B2

United States Patent
Eriksen et al.

(10) Patent No.: US 9,482,283 B2
(45) Date of Patent: Nov. 1, 2016

(54) BEARING INSULATION (71) Applicant: SIEMENS AKTIENGESELLSCHAFT, Munich (DE)

(72) Inventors: Uffe Eriksen, Horsens (DK); Subhra Samanta, Ikast (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/613,578

(22) Filed: Feb. 4, 2015

(65) Prior Publication Data
US 2015/0357876 A1 Dec. 10, 2015

(30) Foreign Application Priority Data

Jun. 5, 2014 (DE) .......................... 10 2014 210 788
Jun. 5, 2014 (EP) ...................................... 14171362

(51) Int. Cl.
*F16C 41/04* (2006.01)
*F16C 41/00* (2006.01)
(Continued)

(52) U.S. Cl.
CPC ............. *F16C 41/002* (2013.01); *F03D 9/002* (2013.01); *F03D 80/70* (2016.05); *H02K 5/1737* (2013.01); *H02K 11/01* (2016.01); *H02K 11/022* (2013.01);
(Continued)

(58) Field of Classification Search
CPC F16C 19/525; F16C 41/002; F16C 2202/30; F16C 2360/31; F03D 11/0008
See application file for complete search history.

(56) References Cited

U.S. PATENT DOCUMENTS 5,698,479 A * 12/1997 Ogata .................... B29C 70/50
156/256
5,735,615 A * 4/1998 Pontzer ................... F16C 35/00
384/476
(Continued)

FOREIGN PATENT DOCUMENTS

DE 102009014753 A1 9/2010
DE 102009032885 A1 2/2011
(Continued)

OTHER PUBLICATIONS

Paul Nippes et al.: "Bearing Insulation Testing in Rotating Machinery", http://www.marthinusen.co.za/uploads/Files/Bearing%20Insulation&20-%20Paul%20Nippes%20(MPS).pdf.
(Continued)

*Primary Examiner* — Thomas R. Hannon
(74) *Attorney, Agent, or Firm* — Schmeiser Olsen & Watts LLP (57) ABSTRACT

A bearing system for a wind turbine with a generator with an outer rotor, the bearing system including: an inner bearing ring, an outer bearing ring, a first electrical insulation element, a second electrical insulation element, a plurality of roller elements, a first metal element and a second metal element is provided. Therein, the roller elements are arranged at an inner volume between the inner bearing ring and outer bearing ring. The first electrical insulation element includes the first metal element. The second electrical insulation element includes the second metal element. The first electrical insulation element is arranged at least partially around the inner bearing ring in order to provide an electrical shielding to the inner of the bearing system and the second electrical insulation element is arranged at least partially around the outer bearing ring in order to provide an electrical shielding to the inner of the bearing system.

9 Claims, 6 Drawing Sheets (51) Int. Cl.
   *F03D 9/00*       (2016.01)
   *H02K 5/173*      (2006.01)
   *H02K 11/02*      (2016.01)
(52) U.S. Cl.
   CPC ...... *F05B 2220/7066* (2013.01); *Y02E 10/722* (2013.01); *Y02E 10/725* (2013.01)

(56) References Cited

U.S. PATENT DOCUMENTS

| | | | | |
|---|---|---|---|---|
| 2005/0094910 | A1* | 5/2005 | Tsuji | F16C 19/52 384/476 |
| 2010/0329867 | A1 | 12/2010 | Patel et al. | |
| 2012/0008890 | A1* | 1/2012 | Schwarz | F16C 33/62 384/476 |
| 2012/0112466 | A1* | 5/2012 | Junge | H02K 1/276 290/55 |
| 2012/0181792 | A1 | 7/2012 | Pettersen et al. | |
| 2014/0028138 | A1 | 1/2014 | Feher et al. | |

FOREIGN PATENT DOCUMENTS

| | | | | |
|---|---|---|---|---|
| DE | 102009037140 | A1 | 2/2011 | |
| DE | 102013200356 | A1 | 8/2013 | |
| DE | 102012221739 | A1 | 5/2014 | |
| EP | 1950433 | A2 | 7/2008 | |
| EP | 2620643 | A1 * | 7/2013 | .......... F03D 11/0008 |
| WO | WO 2011019136 | A2 * | 2/2011 | .............. F16C 19/52 |

OTHER PUBLICATIONS http://www.skf.com/us/products/mrc/hybrid-ceramic-ball-bearings/index.html.

* cited by examiner

FIG 1  STATE OF THE ART

BEARING INSULATION

CROSS-REFERENCE TO RELATED APPLICATIONS

This application claims priority to European Application No. 14171362.8, having a filing date of Jun. 5, 2014 and German Application No. 102014210788.1, having a filing date of Jun. 5, 2014, the entire contents of which are hereby incorporated by reference.

FIELD OF TECHNOLOGY

The following relates to the field of wind turbines.

BACKGROUND

The rotor of a direct drive generator for wind turbines has a diameter of more than 4 m, dependent on the generator power and torque. The generator rotor of the Siemens Wind Power direct drive turbines for example has an outer diameter of 4.2 m for the SWP 3.0-101 and an outer diameter of 6.5 m for the SWP 6.0-154 and a length of around 2.5 m.

The rotor consists of a front plate, a rotor ring with a certain yoke height and a bearing ring. The complete rotor is also called rotor housing because in the Siemens Wind Power direct drive turbines the rotor is located outside of the stator and acts therefore like a house. The rotor outer surface is directly in contact with the ambient air.

The rotor housing of all the direct drive Siemens Wind Power generators is a single welded and machined steel component. The rotor housing consists of two large cones, which are welded together with a forged steel ring and a rolled steel yoke. This rotor housing is then machined in a large CNC machine.

Previously, it was especially bearings in large DC and AC motors with few poles that risked current flow. In modern electric machines one should be aware of the risk of current flow in both the bearing and the machine's drive chain. This is due to the ever increasing use of frequency converters. In recent years there has been an increase in motors controlled by PWM inverters (variable frequency drives) in industrial HVAC, pumping, and processing equipment. VFD's induce voltage onto the shaft of the driven motor may cause pitting, fluting and finally bearing and motor failure.

Damaged bearings, for instance, can cause generator failures, which lead to unplanned downtime and costly repairs. A single month's wait for parts is unrealistically short considering the worldwide shortage of bearings and other key components. On top of lost revenue is the cost of repairing failed bearings due to for example new bearings, labour, slip rings, and other parts, but also enormous expense of renting and transporting the large crane needed for many repairs must be accounted for.

Bearing currents caused by stator-to-rotor capacitive coupling must be diverted from the shaft by providing a least resistance path to ground other than the bearing themselves.

Moreover, it is known to prevent damage of bearings due to induced shaft currents, by insulating the bearing from the shaft currents and/or by providing an alternative path for the shaft currents to flow. In current designs of direct drive generators, fiberglass laminates are used to isolate the bearing from shaft induced voltage. Fiber glass laminates acts as a good insulation for direct current and low frequency current to enter the bearing, but this is not useful for very high frequency currents, as the capacitance impedance reduces as frequency increases. In current designs shaft grounding brushes are also used to ground stray currents, but this is also not useful to ground very high frequency currents.

The problem addressed in this document is related to generator shaft currents where induced current causes damage to the main bearing of a wind turbine generator. Therefore an electrical insulation of the main bearing may be needed to avoid failure of the generator. Such an electrical insulation increases the effort for producing a direct drive generator. Hence, there may be a need to produce a direct drive generator with an outer rotor in an easier and cost reducing manner.

SUMMARY

According to a first aspect of the invention there is provided a rotor housing for a wind turbine with a generator with an outer rotor, the rotor housing comprising a support structure, wherein the support structure is cylindrical shaped, a front structure, a ring and an electrical insulation element. Therein, the ring and the front structure are attached together at an inner side of the front structure in a horizontal plane forming a front part of the rotor housing. The support structure is attached to the front structure at a front end of the support structure forming a side part of the rotor housing. And the electrical insulation element is arranged between the front part of the rotor housing and the side part of the rotor housing.

The support structure according to embodiments of the invention may be the yoke of the rotor housing.

The front structure according to embodiments of the invention may be for example shaped like a cone.

The ring according to embodiments of the invention may be used to receive bearings or a bearing system used for the rotation of the rotor, and therefore may act as bearing or bearing system housing. Therefore, the ring may be a forged and machined steel ring and the ring may act as the housing of the bearing system of the generator. Therefore, it may be beneficial to not segment the ring acting as the housing of the bearing system of the generator, as this may lead to issues when trying to arrange the bearing system, as any tolerances between segments of a segmented ring may be disadvantageous while operating the generator.

The electrical insulation element according to embodiments of the invention may be an insulation element, which may provide an insulation of electric and/or magnetic fields.

The advantage of this concept is that by insulating the rotor housing between the front part of the rotor housing and the side part of the rotor housing, this insulation may as well provide an electric and or magnetic insulation to the ring.

This aspect of the invention is based on the idea that by providing an electric and/or magnetic insulation to the rotor housing, an easy and cost reducing way may be provided to insulate the ring from occurring electric and/or magnetic fields and therefore also providing this insulation to the bearing and/or bearing system of the rotor housing.

According to a further embodiment of the invention, the electrical insulation element is arranged between the front part of the rotor housing and the side part of the rotor housing by means of a reversible connection, preferably by means of a bolt or a screw.

Instead of bolting or screwing it may be also possible to weld, rivet or glue the parts together, if an easy way of changing the parts is not desired.

This embodiment of the invention is based on the idea that the electric insulation element may be easily changed and therefore even existing rotor housings may be upgraded with such an electric insulation element in a cost effective manner.

According to a further embodiment of the invention, the support structure, the front structure and/or the electrical insulation element is formed out of segmented parts.

This embodiment of the invention is based on the idea that sub parts of the rotor housing may be small and therefore easier to transport and to handle. These segments may be optimized for shipment in standard containers.

According to a further embodiment of the invention, the number of segmented electrical insulation element parts equals the number of segmented support structure parts, preferably the number of segmented front structure parts and the number of segmented electrical insulation element parts each equal the number of segmented support structure parts.

The segmented support structure parts, the segmented front structure parts and the segmented electric insulation element parts each may be made as one piece items, where these single steel plates and/or pieces may be welded, riveted or bolted to each other.

By using bolts, screws or rivets for attaching each segmented part to another segmented part it may be simple to adjust the parts to each other so as to not excess the predefined tolerances for the rotor housing.

This embodiment of the invention is based on the idea that attaching one segmented front structure part together with one segmented support structure part and together with one segmented electric insulation element part may simplify the assembling process of the rotor housing.

According to a further embodiment of the invention, the rotor housing further comprises a discharging element. Therein, the discharging element is attached to the side part of the rotor housing, the discharging element preferably comprising a grounding brush and/or a graphite element.

This embodiment of the invention is based on the idea that for some of the currents induced to the rotor housing may be provided an alternative path for these shaft currents to flow.

According to a further embodiment of the invention, the rotor housing further comprises a foil element. Therein, the foil element is attached to the electrical insulation element in order to provide a further electrical shielding to the interior of the rotor housing.

An electrical shielding according to embodiments of the invention may be a shielding of electric and/or magnetic fields.

This embodiment of the invention is based on the idea that the foil element may provide an additional electrical shielding to the interior of the rotor housing.

According to a further aspect of the invention there is provided a bearing system for a wind turbine with a generator with an outer rotor, preferably for a generator with an outer rotor for a rotor housing of a wind turbine, the bearing system comprising an inner bearing ring, an outer bearing ring, a first electrical insulation element, a second electrical insulation element, a plurality of roller elements, a first metal element and a second metal element. Therein, the inner bearing ring is surrounded by the plurality of roller elements. The plurality of roller elements is surrounded by the outer bearing ring. The first electrical insulation element comprises the first metal element. The second electrical insulation element comprises the second metal element. The first electrical insulation element is arranged around the inner bearing ring in order to provide an electrical shielding to the inner of the bearing system. And the second electrical insulation element is arranged around the outer bearing ring in order to provide an electrical shielding to the inner of the bearing system.

This aspect of the invention is based on the idea that by providing an electric and/or magnetic insulation directly to the inner and to the outer ring of a bearing system, an easy and cost reducing way may be provided to insulate the interior of the bearing system from occurring electric and/or magnetic fields and therefore from preventing damage to the bearing system caused by such fields.

According to a further embodiment of the invention, the bearing system further comprises a third metal element and/or a fourth metal element. Therein, the third metal element is arranged at a first side of the first electrical insulation element in order to provide an additional electrical shielding to the inner of the bearing system, and/or the fourth metal element is arranged at a first side of the second electrical insulation element in order to provide the additional electrical shielding to the inner of the bearing system.

This embodiment of the invention is based on the idea that one or more additional metal elements may provide an additional electrical shielding to the interior of the bearing system.

According to a further embodiment of the invention, the first metal element is arranged around the first electrical insulation element. The first metal element and the third metal element are arranged at opposite sides of the first electrical insulation element. The second metal element is arranged around the second electrical insulation element. And the second metal element and the fourth metal element are arranged at opposite sides of the second electrical insulation element.

By arranging two metal elements around an electrical insulation element, the electrical insulation element may be sandwiched between the both metal elements.

This embodiment of the invention is based on the idea that by using such a sandwiched electrical insulation element surrounded by two metal elements, a sandwiched module may be provided, which may lead to an even better insulation of the interior of the bearing system. Moreover, by using a sandwiched module, such insulation may be provided in a cost efficient way.

According to a further embodiment of the invention, the first electrical insulation element and the second electrical insulation element each comprise a glass fiber laminates.

Glass fiber laminates according to embodiments of the invention may provide high capacitive impedance between around 20 Ohm and 1 k Ohm at current frequencies below 10 MHz, while the capacitive impedance may rise quickly with decreasing current frequencies.

This embodiment of the invention is based on the idea that by using a glass fiber laminate, it may be able to block fields occurring through low frequency currents.

According to a further embodiment of the invention, the glass fiber laminates comprises a mesh designed in order to prevent intrusion of electromagnetic fields generated by frequencies into the respective electrical insulation element. Preferably, the mesh comprises a metallic element. More preferably, the mesh prevents intrusion of electromagnetic fields generated by frequencies equal or larger than 10 MHz into the respective electrical insulation element.

The mesh according to embodiments of the invention may be a metal mesh, able to block fields occurring through high frequency currents, like currents with current frequencies of 10 MHz or higher.

This embodiment of the invention is based on the idea that by using a glass fiber laminates comprising a mesh, it may be able to block fields occurring through high frequency currents.

According to a further embodiment of the invention, the mesh is sandwiched between a respective first part of the respective glass fiber laminates and a respective second part of the respective glass fiber laminates.

This embodiment of the invention is based on the idea that by sandwiching the mesh between the glass fiber laminates an easy and cost reducing way for blocking fields occurring through low and high frequency currents may be provided.

According to a further embodiment of the invention, the respective glass fiber laminates comprises a conductive electromagnetic shielding coating.

This embodiment of the invention is based on the idea that a glass fiber laminates comprising a conductive electromagnetic shielding coating may provide an additional electrical shielding to the interior of the bearing system.

According to a further aspect of the invention there is provided a rotor housing for a wind turbine with a generator with an outer rotor, preferably for a generator with an outer rotor of a wind turbine, the rotor housing comprising a support structure, wherein the support structure is cylindrical shaped, a front structure, a ring and a bearing system according to any of the embodiments of the preceding aspects of the invention. Therein, the ring and the front structure are attached together at an inner side of the front structure in a horizontal plane, forming a front part of the rotor housing. The support structure is attached to the front structure at a front end of the support structure, forming a side part of the rotor housing. And the bearing system is arranged inside the ring of the rotor housing.

This aspect of the invention is based on the idea that by providing a rotor housing with an integrated electrical shielded bearing system, a more robust generator for a wind turbine may be provided.

According to a further embodiment of the invention, each electrical insulation element provides an insulation of low frequency and high frequency direct current flow, preferably each electrical insulation element provides this insulation to a bearing or bearing system of the ring of the rotor housing, and more preferably to a bearing oil film of the bearing or the bearing system of the ring of the rotor housing.

A bearing or bearing system according to embodiments of the invention may use a bearing oil film in order to prevent damage to the rolling elements of the bearing or bearing system while in use. As the lubrication behavior of the bearing oil film may change through intruding electromagnetic fields into the bearing oil film and thus lead to damages of the rolling elements and/or the bearing or bearing system, such an electromagnetic insulated bearing system may provide the bearing system from damage even in environments where high frequency currents may be expected, like inside a generator for a wind turbine.

This aspect of the invention is based on the idea that by providing electrical insulation element to the bearing system, the bearing oil film may be prevented from changing its behavior in high frequency current environments, thus preventing the bearing or bearing system from damages caused by occurring electromagnetic fields of these currents.

According to a further aspect of the invention, there is provided a method for manufacturing a ring for a rotor housing according to any of the embodiments of the preceding aspects of the invention, the method comprising: Forming a bearing system according to any of the embodiments of the preceding aspects of the invention by: Providing each respective metal element to the respective first and/or second electrical insulation element; arranging the plurality of roller elements around the first electrical insulation element; and arranging the second electrical insulation element around the plurality of roller elements; and casting the ring around the bearing system.

This aspect of the invention is based on the idea that a casted ring acting as a bearing system housing concept production method may lead to a production of a direct drive generator in an easier and cost reducing manner.

According to a further aspect of the invention, there is provided a generator with an outer rotor, the generator comprising a rotor housing according to any of the embodiments of the preceding aspects of the invention.

According to a further aspect of the invention, there is provided a wind turbine, comprising a generator device with an outer rotor, and the generator comprising a rotor housing according to any of the embodiments of the preceding aspects of the invention.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

The illustration in the drawing is schematically. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Figure 1:
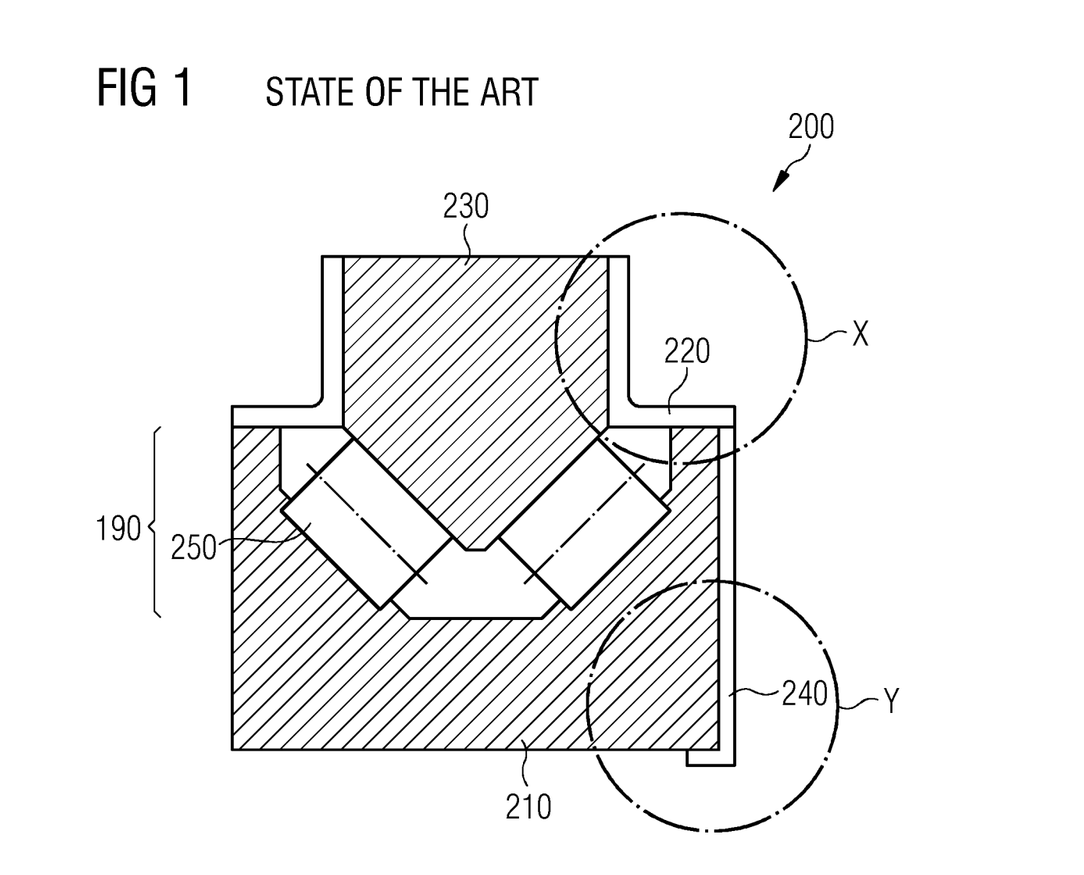
FIG. 1 shows a schematic view of a part of a state of the art bearing system for a rotor housing for a generator, with an outer rotor according to an exemplary embodiment of the invention.

FIG. 1 shows a schematic drawing of a part of a state of the art bearing system for a rotor housing for a generator with an outer rotor according to an exemplary embodiment of the invention. Previously, it was especially bearings in large DC and AC motors with few poles that risked current flow. In modern electric machines one should be aware of the risk of current flow in both the bearing and the machine's drive chain. This occurs due to the ever increasing use of frequency converters. In recent years there has been an increase in motors controlled by PWM inverters (variable frequency drives—VFD's) in industrial HVAC, pumping, and processing equipment. VFD's induce voltage onto the shaft of the driven motor which may cause pitting, fluting and finally bearing and motor failure. Damaged bearings for instance, can cause generator failures, which lead to unplanned downtime and costly repairs. A single month's wait for parts is unrealistically short considering the worldwide shortage of bearings and other key components. On top of lost revenue is the cost of repairing failed bearings (new bearings, labor, slip rings, and other parts) but also enormous expense of renting and transporting the large crane needed for many repairs must be accounted for. Bearing currents caused by stator-to-rotor capacitive coupling must be diverted from the shaft by providing a least resistance path to ground other than the bearing themselves. In current design of direct drive generators often fiberglass laminates are used to isolate bearing from shaft induced voltage. Fiber glass laminates may act as an electrical insulation element 220 and may be a good insulation for direct current DC and low frequency current to prevent electric fields from entering the bearing, but it is not useful for high and very high frequency currents, as the capacitance impedance decreases as the current frequency increases. Basically an isolated bearing layer can be construed as a resistor and a capacitor in parallel connection. In case of DC and low frequency AC the choice of the insulation material depends on the electrical resistance, whereas for high frequency alternating current, such as a frequency converter, the capacitance is decisive. Therefore, the method that provides the best protection depends on the machine design. In order to ensure a good insulation, the electrical resistance should be high and therefore the capacitance as low as possible. Variable Frequency Drives (VFD) induce significant voltage onto the shaft of the driven motor, because of the kilohertz switching of the insulated gate bipolar transistors (IGBTs), which produce the pulse width modulation used to control the motor. Shaft grounding brushes are used to ground stray currents, but primarily use to ground DC and low frequency AC.

Therefore, FIG. 1 shows a part of a state of the art bearing system 200 for a generator with an outer rotor for a rotor housing of a wind turbine, the bearing system 200 comprising an inner bearing ring, an outer bearing ring, a first electrical insulation element 220, a second electrical insulation element 240 and a bearing 190 with a plurality of roller elements 250. The first electrical insulation element 220 is arranged around the inner bearing ring 210 in order to provide an electrical shielding to the inner of the bearing system 200. And the second electrical insulation element 240 is arranged at an outer side of the bearing system 200 in order to provide an electrical shielding to the inner of the bearing system 200. The circles depicted with "X" and "Y" identify specific portions of the bearing system 200. In accordance with embodiments of the invention described hereinafter with reference to FIG. 9 these portions are modified.

Figure 2:
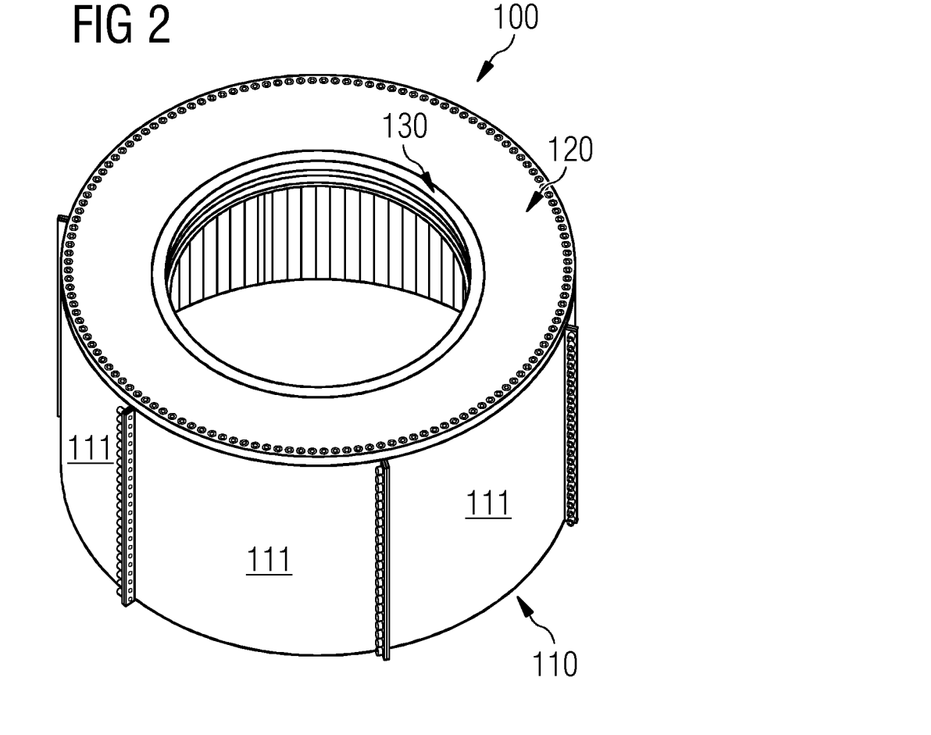
FIG. 2 shows a schematic, perspective view of an embodiment of a proposed rotor housing for a generator with an outer rotor.

FIG. 2 shows a three dimensional drawing of a proposed rotor housing for a generator with an outer rotor according to an exemplary embodiment of the invention. FIG. 2 shows a rotor housing 100 for a generator with an outer rotor, the rotor housing 100 comprising a support structure 110, wherein the support structure 110 is cylindrical shaped, a front structure 120, a ring 130 and an electrical insulation element 140 (not shown in FIG. 2, see FIG. 5). Therein, the ring 130 and the front structure 120 are attached together at an inner side 121 of the front structure 120 in a horizontal plane forming a front part 150 of the rotor housing 100 (see FIG. 3). The support structure 110 is attached to the front structure 120 at a front end of the support structure 110 forming a side part 160 of the rotor housing 100 (see FIG. 5). And the electrical insulation element 140 is arranged between the front part 150 (see FIG. 3) of the rotor housing 100 and the side part 160 of the rotor housing 100. Moreover, the rotor housing 100 is made of segmented rotor housing parts 111.

Figure 3:
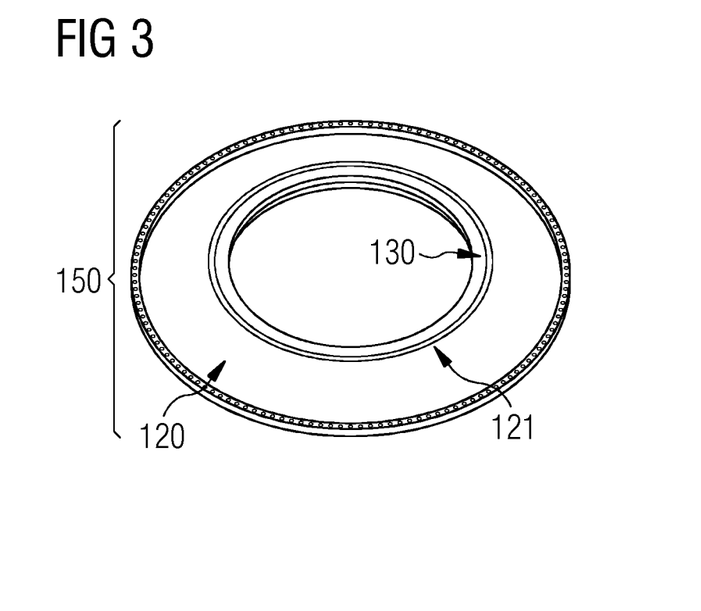
FIG. 3 shows a schematic, perspective view of an embodiment of a proposed front structure and a ring for a rotor housing as shown in FIG. 2.

FIG. 3 shows a three dimensional drawing of a proposed front structure and a ring for a rotor housing as shown in FIG. 2 according to an exemplary embodiment of the invention. Therein, the ring 130 and the front structure 120 are attached together at an inner side 121 of the front structure 120 in a horizontal plane forming the front part 150 of the rotor housing 100.

Figure 4:
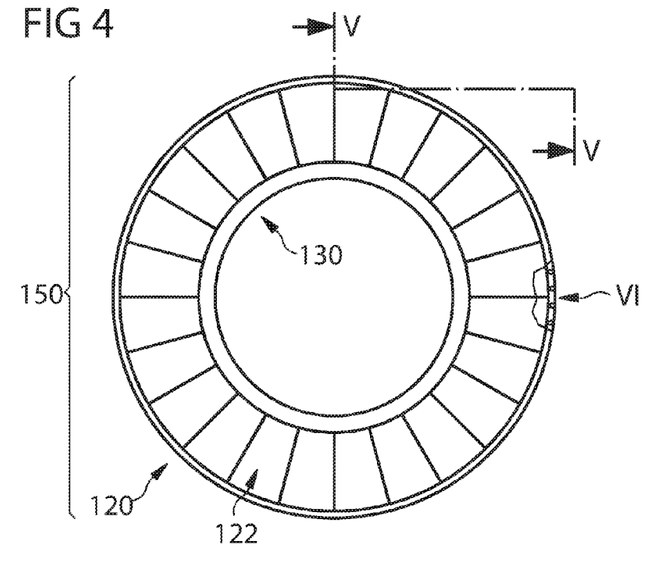
FIG. 4 shows a schematic view of an embodiment of a proposed segmented front structure and a ring with an electrical insulation element for a rotor housing as shown in FIG. 2.

FIG. 4 shows a schematic drawing of a proposed segmented front structure and a ring with an electrical insulation element for a rotor housing as shown in FIG. 2 according to an exemplary embodiment of the invention. Therein, the front structure 120 is made of segmented front structure parts 122 and comprises an electrical insulation element 140 (see FIG. 5). Moreover, in FIG. 4 a cut-out VI is shown, which will be illustrated in more detail in FIG. 6. In FIG. 4 also a cutting plane V is shown, which will be illustrated in FIG. 5.

Figure 5:
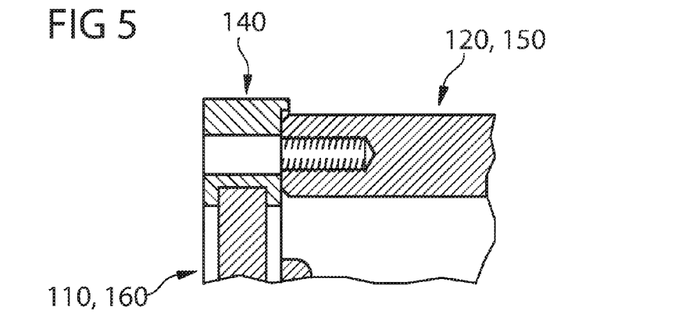
FIG. 5 shows a an inner side view V of a part of the proposed front structure as shown in FIG. 4 and a part of the proposed support structure as shown in FIG. 2 with an embodiment of an electrical insulation element.

FIG. 5 shows a schematic drawing of an inner side view V of a part of the proposed front structure as shown in FIG.

4 and a part of the proposed support structure as shown in FIG. 2 with an electrical insulation element according to an exemplary embodiment of the invention. Therein, the electrical insulation element 140 is arranged between the front part 150 of the rotor housing 100 and the side part 160 of the rotor housing 100. The electrical insulation element 140 is mounted on the support structure 110 and screwed to the front structure.

Figure 6:
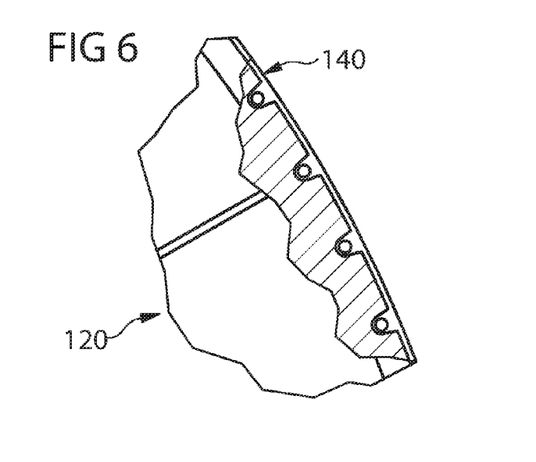
FIG. 6 shows a more detailed drawing of a part VI of the proposed segmented front structure as shown in FIG. 4 with an embodiment of an electrical insulation element.

FIG. 6 shows a more detailed drawing of a part VI of the proposed segmented front structure as shown in FIG. 4 with an electrical insulation element according to an exemplary embodiment of the invention. The detailed view VI of FIG. 6 illustrates the electrical insulation element 140 being attached to the front structure 120 by means of bolts. The electrical insulation element 140 is arranged between the front part 150 of the rotor housing 100 and the side part 160 of the rotor housing 100 as shown in FIG. 5 by means of providing a reversible connection, preferably by means of bolting or screwing.

Figure 7:
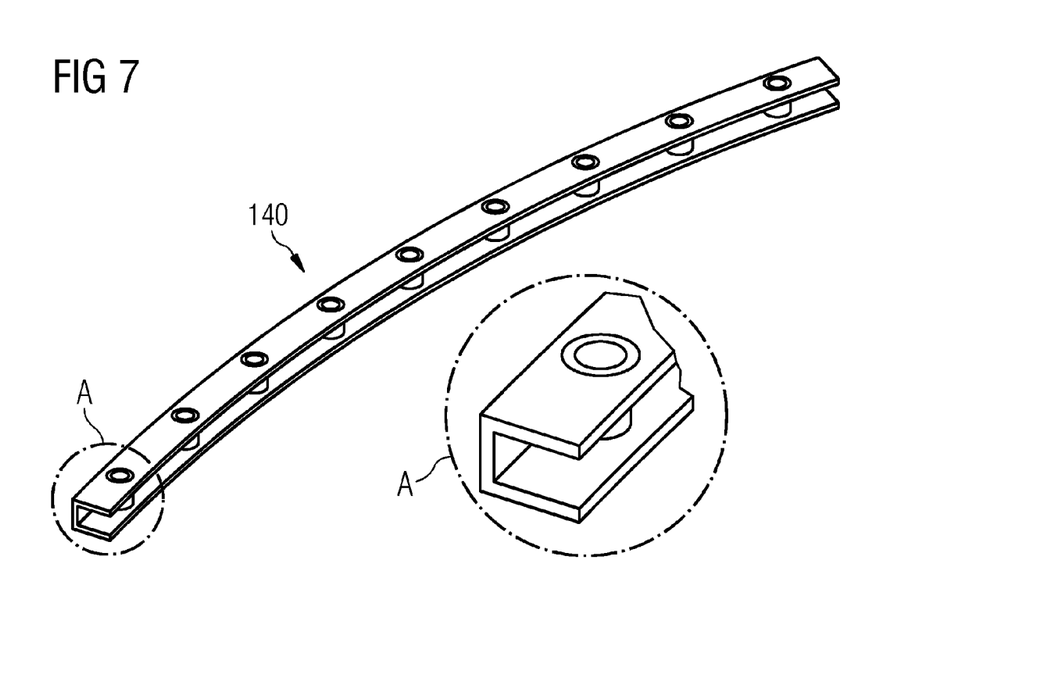
FIG. 7 shows a schematic, perspective view and a scope view of an embodiment of a proposed electrical insulation element as shown in FIG. 6.

FIG. 7 shows a three dimensional drawing and a scope view of a proposed electrical insulation element as shown in FIG. 6 according to an exemplary embodiment of the invention. In FIG. 7, a part of the electrical insulation element 140 is shown and the scope A of the electrical insulation element 140 is shown in a magnified view in more detail. The electrical insulation element 140 comprises a plurality of holes for bolts, screws or the like, for fixing the electrical insulation element 140 to the front structure 120 as shown for example in FIG. 4.

Figure 8:
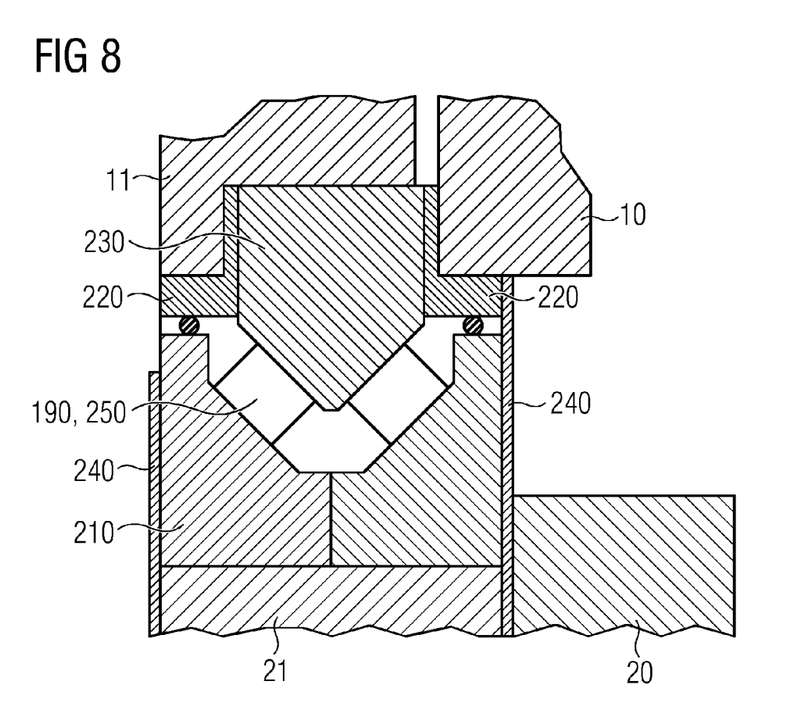
FIG. 8 shows an inner side view of an embodiment of a proposed rotor housing as shown in FIG. 2 with an electrical insulation element, a foil and a discharging element.

FIG. 8 shows a schematic drawing of an inner side view of a proposed rotor housing as shown in FIG. 2 with an electrical insulation element, a foil and a discharging element according to an exemplary embodiment of the invention. In FIG. 8, a first turbine element 10, which is partially located outside of the nacelle, like for example a hub, may be fixed to the outer bearing ring 230. Between the outer bearing ring 230 and the first turbine element 10, the first electrical insulation element 220 is interposed. The first electrical insulation element 220 is mounted to the surface of the outer bearing ring 230. The outer bearing ring 230 has an outer surface to which a first turbine element 10 of the wind turbine is coupleable. Hence, the first turbine element 10 is not in direct contact with the outer bearing ring 230 but is separated from the outer bearing ring 230 by the thickness of the first electrical insulation element 220. The first turbine element 10 is electrically isolated from the outer bearing ring 230. Furthermore, a further first turbine element 11, which is completely located inside the nacelle, like for example a rotor of a generator, may be additionally attached to the outer bearing ring 230. The further first turbine element 11 is not in direct contact with the first turbine element 10. An electrical isolation is provided because an electrical path between the first turbine element 10 and the further first turbine element 11 is interrupted by the first electrical insulation element 220 and by an air gap between the first turbine element 10 and the further first turbine element 11. A second turbine element 20, such as a turbine element which is partially located outside of the nacelle, like for example a turbine structure of the nacelle, like for example a rotor housing 100, may be fixed to a part of the inner bearing ring 210. Between the inner bearing ring 210 and the second turbine element 20, the second electrical insulation element 240 is interposed. Hence, the second turbine element 20 is electrically isolated from the inner bearing ring 210 by the second electrical insulation element 240. A lightning stroke which attacks at the housing of the nacelle will not be transferred to the first turbine element 10, the further first turbine element 11 and a further second turbine element 21. The electrical insulation elements 220, 240 ensure that forces can be transferred between the respective bearing ring 210, 230 and the respective turbine element 10, 11, 20, 21. Therefore, the electrical isolated ring 130 may be formed sufficiently robust for withstanding the transmitted forces. Specifically, the entire wind turbine loads needs to be transferred from the turbine element 10, 11, 20, 21 through the isolating material to the bearing ring 230, 240 and vice versa.

Figure 9:
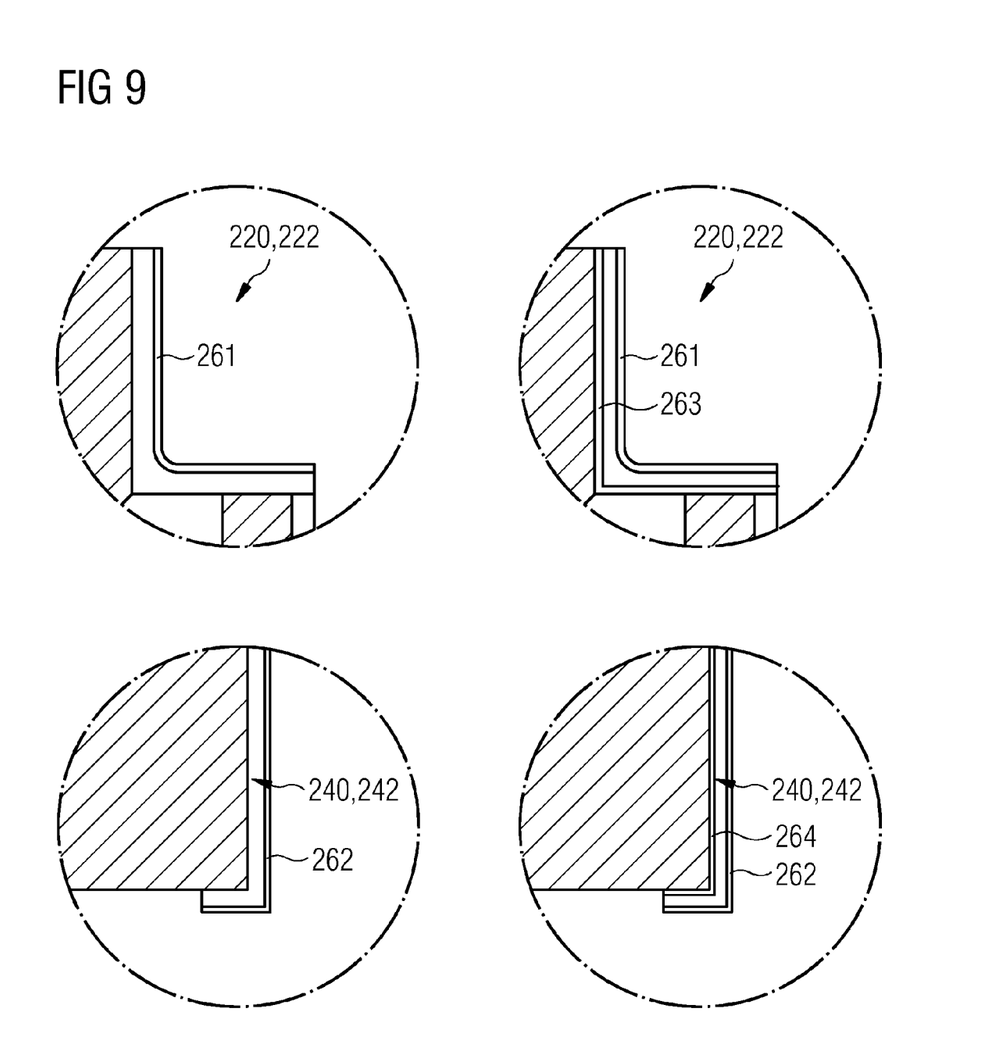
FIG. 9 shows a schematic view of an embodiment of a proposed bearing systems for a rotor housing as shown in FIG. 2 for a generator with an outer rotor.

FIG. 9 shows two embodiments of the invention with respect to the portions "X" and "Y" depicted in FIG. 1. The two left subfigures represent a first embodiment of the portions "X" and "Y". The two right subfigures represent a second embodiment of the portions "X" and "Y". The second embodiment is a further development of the first embodiment. In accordance with the first embodiment shown partly with the two left subfigures the bearing system 200 comprises an inner bearing ring 210 (not shown in FIG. 9), an outer bearing ring 230 (not shown in FIG. 9), a first electrical insulation element 220, a second electrical insulation element 240, a plurality of roller elements 250, a first metal element 261, and a second metal element 262. Therein, the inner bearing ring 210 (not shown in FIG. 9) is surrounded by the plurality of roller elements 250. The plurality of roller elements 250 is surrounded by the outer bearing ring 230 (not shown in FIG. 9). The first electrical insulation element 220 comprises the first metal element 261. The second electrical insulation element 240 comprises the second metal element 262. The first electrical insulation element 220 is arranged around the outer bearing ring 230 in order to provide an electrical shielding to the outer of the bearing system 200. And the second electrical insulation element 240 is arranged around the inner bearing ring 210 in order to provide an electrical shielding to the inner of the bearing system 200. The plurality of roller elements 250 form a bearing 190 (not shown in FIG. 9).

The bearing system 200 according to the second embodiment further comprises a third metal element 263, and a fourth metal element 264. Therein, the third metal element 263 is arranged at a first side 221 of the first electrical insulation element 220 in order to provide an additional electrical shielding to the outer of the bearing system 200. And the fourth metal element 264 is arranged at a first side 241 of the second electrical insulation element 240 in order to provide the additional electrical shielding to the inner of the bearing system 200. The first metal element 261 is arranged at least partially around the first electrical insulation element 220. The first metal element 261 and the third metal element 263 are arranged at opposite sides of the first electrical insulation element 220. The second metal element 262 is arranged at least partially around the second electrical insulation element 240. And the second metal element 262 and the fourth metal element 264 are arranged at opposite sides of the second electrical insulation element 240.

The first electrical insulation element 220 and the second electrical insulation element 240 each comprise a glass fiber laminates 222, 242. Preferably, this insulation structure prevents an intrusion of electromagnetic fields generated by frequencies equal or larger than 10 MHz into the respective electrical insulation element 220, 240 and therefore also prevents intrusion of these electromagnetic fields into the bearing 190 (not shown in FIG. 9), which means into the inner of the bearing system 200 (not shown in FIG. 9). Therefore, the introduced novel bearing insulation material may efficiently prevent an intrusion of DC and low frequency current as well as high and very high frequency current into the bearing oil film which may cause a machine breakdown. Such an electrical insulation element 220 may be shielded with a metallic mesh 223, 243 designed to prevent an intrusion of electromagnetic frequencies around 10 MHz and above. The metallic mesh 223, 243 may also be grounded externally. A metallic mesh 223, 243 (see FIGS. 10, 11) acting as a shield may even be placed in between such a respective electrical insulation element 220, 240 as a sandwich and be molded for example with resin. Also such a respective electrical insulation element 220, 240 may be coated with a conductive electromagnetic shielding coating. If for example, fiber glass laminates are used as such a respective electrical insulation element 220, 240, the surface of the fiber glass laminates should be treated to make it compatible to the electromagnetic shielding coating, to prevent the coating from peeling off. Furthermore, the fiber glass insulation thickness may be reduced as the high frequency current blocking ability of the bearing system will no longer depend on the capacitive impedance of the fiber glass, but instead this will be achieved by an electromagnetic wave shielding mechanism. A conductive electromagnetic shielding coating may also be used on the stator surface and/or rotor surface to reduce a high frequency coupling between the stator and the rotor.

Figure 10:
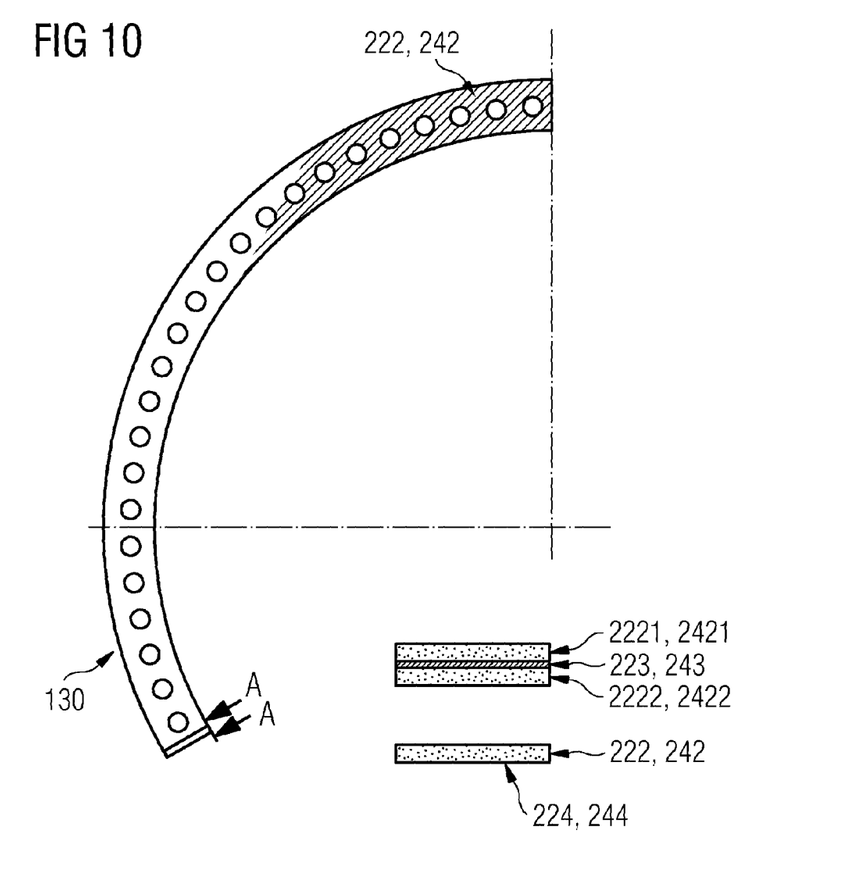
FIG. 10 shows a schematic view of a part of a proposed ring as shown in FIGS. 2, 3 and 4 of an embodiment of a proposed rotor housing as shown in FIG. 2, an inner side view of a sandwich structure with a mesh in a glass fiber laminates and a glass fiber laminates with a conductive electromagnetic shielding for the proposed ring.

FIG. 10 shows a schematically drawing of a part of a proposed ring as shown in FIGS. 2, 3 and 4 of a proposed rotor housing as shown in FIG. 2. FIG. 10 further shows an inner side view of a sandwich structure with a mesh in a glass fiber laminates and a glass fiber laminates with a conductive electromagnetic shielding for the proposed bearing system in the ring according to an exemplary embodiment of the invention. The ring 130 comprises a mesh 223, 243 designed in order to prevent intrusion of electromagnetic fields generated by high frequency current into the ring 130. Preferably, the mesh 223, 243 comprises a metallic element, and more preferably the mesh 223, 243 prevents intrusion of electromagnetic fields generated by high frequency current equal or larger than 10 MHz into the ring 130. In the second part of FIG. 10, the mesh 223, 243 is sandwiched between a respective first part 2221, 2421 of the respective glass fiber laminates 222, 242 and a respective second part 2222, 2422 of the respective glass fiber laminates 222, 242. The respective glass fiber laminates 222, 242 comprises a conductive electromagnetic shielding coating 224, 244.

Figure 11:
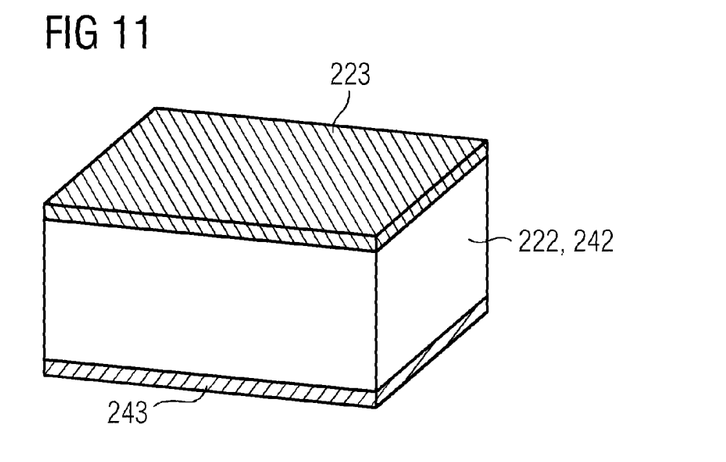
FIG. 11 shows an inner side view of an embodiment of a sandwich structure with a glass fiber laminates in a mesh for the proposed ring.

FIG. 11 shows a schematically drawing of an inner side view of a sandwich structure with a glass fiber laminates in a mesh for the proposed ring according to an exemplary embodiment of the invention. The ring 130 (see FIG. 10) comprises an upper mesh 223 and a lower mesh 243, both designed in order to prevent intrusion of electromagnetic fields generated by high frequency current into the ring 130. In FIG. 11, the glass fiber laminates 222, 242 is sandwiched between an upper mesh 223 and a lower mesh 243. Therefore, the sandwich structure shown in FIG. 11 may act as an alternative solution to the sandwich structure shown in FIG. 10.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

It should be noted that the term "attaching" may comprise bolting, riveting, welding or any other bonding of two materials, depending of the use of the materials and/or parts attached to each other. Where possible and useful, welding, bolting or riveting may be substituted by each other.

It is noted that it may also be possible in further refinements of the invention to combine features from different illustrative embodiments described herein. It should also be noted that reference signs in the claims should not be construed as limiting the scope of the claims.

The above described embodiments of the present invention may provide in particular the following advantages:

The proposed embodiments of the invention may lead to the use of a bearing system for a rotor housing, where the proposed bearing insulation system is able to prevent DC currents and low frequency to very high frequency currents from damaging the bearing oil film. Moreover, the construction effort is small and such a bearing system can be very easily incorporated into existing designs. With this, the proposed embodiments of the invention may improve the bearing lifetime.

The proposed embodiments of the invention may also lead to the use of an electrically insulating element arranged in the rotor housing of the generator. The electrically insulating element should be able to fit onto a rotor having at least a diameter of 2.5 to 6.5 meter and above and at the same time the layout of the electrically insulating element has to able to withstand occurring mechanical forces in the rotor construction.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A bearing system for a wind turbine with a generator with an outer rotor, the bearing system comprising:
    an inner bearing ring;
    an outer bearing ring;
    a first electrical insulation element;
    a second electrical insulation element;
    a plurality of roller elements;
    a first metal element; and
    a second metal element;
    wherein the plurality of roller elements are arranged at an inner volume between the inner bearing ring and outer bearing ring,
    wherein the first electrical insulation element comprises the first metal element, the second electrical insulation element comprises the second metal element, the first electrical insulation element is arranged at least partially around the inner bearing ring in order to provide an electrical shielding to the inner of the bearing system, and the second electrical insulation element is arranged at least partially around the outer bearing ring in order to provide an electrical shielding to the inner of the bearing system;
    wherein the first electrical insulation element and the second electrical insulation element each comprise a glass fiber laminates, the glass fiber laminates comprising a mesh.

2. The bearing system as set forth in claim 1, wherein the first metal element is arranged on one side of the first electrical insulation element, and the second metal element is arranged on one side of the second electrical insulation element.

3. The bearing system as set forth in claim 2, further comprising
a third metal element, and
a fourth metal element, wherein the first metal element and the third metal element are arranged at opposite sides of the first electrical insulation element, and
the second metal element and the fourth metal element are arranged at opposite sides of the second electrical insulation element.

4. The bearing system as set forth in claim 1, wherein the mesh prevents intrusion of electromagnetic fields generated by frequencies into the respective electrical insulation element, the mesh comprising a metallic element, and the mesh preventing intrusion of electromagnetic fields generated by frequencies equal or larger than 10 MHz into the respective electrical insulation element.

5. The bearing system as set forth in claim 4, wherein the mesh is sandwiched between a respective first part of the respective glass fiber laminates and a respective second part of the respective glass fiber laminates.

6. The bearing system as set forth in claim 1, wherein the respective glass fiber laminates comprises a conductive electromagnetic shielding coating.

7. The bearing system as set forth in claim 1, wherein the bearing system is for a wind turbine with a generator with an outer rotor for a rotor housing of the wind turbine.

8. A bearing system for a wind turbine with a generator with an outer rotor, the bearing system comprising:
an inner bearing ring;
an outer bearing ring;
a first electrical insulation element;
a second electrical insulation element;
a plurality of roller elements;
a first metal element; and
a second metal element;
wherein the plurality of roller elements are arranged at an inner volume between the inner bearing ring and outer bearing ring,
wherein the first electrical insulation element comprises the first metal element, the second electrical insulation element comprises the second metal element, the first electrical insulation element is arranged at least partially around the inner bearing ring in order to provide an electrical shielding to the inner of the bearing system, and the second electrical insulation element is arranged at least partially around the outer bearing ring in order to provide an electrical shielding to the inner of the bearing system;
wherein the first electrical insulation element comprises a glass fiber laminates, which prevent intrusion of electromagnetic fields;
wherein the glass fiber laminates comprise a mesh, the mesh comprising a metallic element.

9. The bearing system of claim 8, wherein the mesh comprises a metallic element and prevents intrusion of electromagnetic fields generated by frequencies equal or larger than 10 MHz into the respective electrical insulation element.

* * * * *